United States Patent
Li et al.

(10) Patent No.: US 7,766,644 B2
(45) Date of Patent: Aug. 3, 2010

(54) INJECTION MOLD HAVING A MOVABLE SLIDE MEMBER

(75) Inventors: Guoming Li, Mississauga (CA); Thomas McGinley, Caledon (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 241 days.

(21) Appl. No.: 12/280,053

(22) PCT Filed: Mar. 8, 2007

(86) PCT No.: PCT/CA2007/000392

§ 371 (c)(1),
(2), (4) Date: Aug. 20, 2008

(87) PCT Pub. No.: WO2007/101351

PCT Pub. Date: Sep. 13, 2007

(65) Prior Publication Data

US 2009/0011070 A1    Jan. 8, 2009

Related U.S. Application Data

(63) Continuation-in-part of application No. 11/370,029, filed on Mar. 8, 2006, now Pat. No. 7,381,049.

(51) Int. Cl.
*B29C 45/44* (2006.01)
(52) U.S. Cl. .................. 425/537; 264/334; 425/556
(58) Field of Classification Search .............. 425/537, 425/556; 264/334
See application file for complete search history.

(56) References Cited

U.S. PATENT DOCUMENTS

| 3,718,415 | A | 2/1973 | De Felice |
|---|---|---|---|
| 5,350,289 | A | 9/1994 | Martin |
| 5,421,717 | A | 6/1995 | Hynds |
| 5,736,173 | A | 4/1998 | Wright et al. |
| 6,206,681 | B1 | 3/2001 | Kawase et al. |
| 6,450,797 | B1 | 9/2002 | Joseph |
| 6,569,370 | B1 | 5/2003 | Amin et al. |
| 6,799,962 | B2 | 10/2004 | Mai et al. |
| 6,989,124 | B2 | 1/2006 | Miller et al. |

FOREIGN PATENT DOCUMENTS

CA    2547763  A1    6/2005

OTHER PUBLICATIONS

PCT International Search Report, Jun. 8, 2007, 3 pages.

*Primary Examiner*—Tim Heitbrink
(74) *Attorney, Agent, or Firm*—Husky Intellectual Property Services

(57) ABSTRACT

An injection mold including a connecting structure for separating confronting faces of a slide member and a mold base, respectively, during a movement of the slide member. In accordance with several embodiments of the invention, the connecting structure may include a compressible member such that the slide member is biased away from the mold base, and wherein a positive contact between the confronting surfaces is configurable in response to an applied clamping force between the slide member and the mold base. In accordance with an alternative embodiment of the invention a cam arrangement links the slide member and the mold base enabling a positive contact between the confronting surfaces when the slide member is arranged in the in-mold position, and providing a gap between the confronting surfaces during at least a portion of an interval when the slide member is moving.

14 Claims, 17 Drawing Sheets

INJECTION MOLD HAVING A MOVABLE SLIDE MEMBER

TECHNICAL FIELD

The present invention relates, generally, to molding systems, and more particularly, but not exclusively, to an injection mold of a molding system configured for producing preforms.

BACKGROUND OF THE INVENTION

U.S. Pat. Nos. 5,736,173 and 6,569,370 disclose a preform injection mold including a stripper plate that supports a wear plate on its upper surface. Opposed slide bars, having neck rings mounted thereon, are slidably supported by the wear plate.

U.S. Pat. No. 6,450,797 discloses molding apparatus including a pair of slide bar inserts that are laterally movable into and out of engagement with other mold components.

U.S. Pat. No. 6,799,962 discloses a stripper assembly for an injection molding machine. The assembly comprises a slide bar pair consisting of a first slide bar and a second slide bar. Transmission means is operatively coupled to the first slide bar and the second slide bar to transform movement of the first slide bar in one direction into movement of the second slide bar in an opposite direction.

FIG. 1 is a cross-sectional view through a portion of an injection mold of U.S. Pat. No. 6,569,370. Generally, the mold is shown to include a mold base 16 comprising a core plate 3, a stripper plate 17, and a cavity plate 10, having a stack 1 of molding inserts arranged therein. FIG. 1 shows the mold in a mold-closed position ready for injection of the plastic into the mold. The stack 1 includes a mold core 2 fitted into the core plate 3 and retained therein by a lock ring 4 and bolts 5. The mold core 2 contains a cooling tube 6 for the transmission of cooling fluid from a source within the core plate 3 to remove heat from the injected material in the mold cavity 7 and solidify the molded part in the mold cavity 7. The stack 1 comprises a set of complementary molding inserts including a cavity insert 8 and an adjacent gate insert 9 that are retained in the cavity plate 10 by a cavity flange 11 and bolts (not shown). Cooling channels 12 circulate cooling fluid from a source through the cavity insert 8 and gate insert 9 to remove heat from the injected material. The mold base 16 also includes a pair of slide bars 15A and 15B that are slidably supported on a wear plate 19, itself mounted on the stripper plate 17. The slide bars 15A, 15B are configured for carrying a pair of neck rings 13 and 14 of the mold stack 1 between an in-mold position and an out-mold position. The wear plate 19 is sacrificial material and reduces the wear between the slide bars 15A, 15B and the stripper plate 17 when the neck rings 13 and 14 are moved apart by the slide bars 15A, 15B to release a molded part from the mold cavity 7. Cooling channels 18 circulate cooling fluid from a source through the neck rings 13 and 14 to remove heat from the injected material. Molten material is conveyed to the mold cavity via a hot runner nozzle, hot runner manifold and hot runner stacks.

FIG. 2 is a partial perspective view of a known slide bar and stripper assembly that may be used with the stack 1 of FIG. 1. In this assembly, the slide bars 21A and 21B are linked to the mold by a connecting structure 61 that includes connecting bars 22A and 22B, respectively, and a pair of gibs 23A and 23B bolted to the stripper plate 25, for slidably arranging the connecting bars 22A and 22B in a guide that is preferably provided as a groove 26 configured in the stripper plate 25. The connecting bars 22A and 22B travel along the stripper plate groove 26 to activate the slide bar 21A and 21B, between an in-mold and an out-mold position, to open and close the neck rings in the mold. For purposes of illustration, a single pair of neck rings 20A and 20B is shown. Wear plates 27, 28 are located between the slide bars 21A and 21B and the stripper plate 25 to reduce wear of the slide bars 21A and 21B and stripper plate 25. Because the wear plates 27, 28 do wear, clamping force cannot be reliably applied therethrough but instead passes along the mold stack. When the clamping force A (see FIG. 1) going through mold stack 1 becomes so high that it could start to wear stack components, it becomes necessary to add clamping force blocks 29, shown with reference to FIG. 1, outside the immediate area of the mold cavities to take excess clamping force.

As shown in FIG. 2, in the prior art, gibs 23A, 23B are attached to the stripper plate 25 to constrain the connecting bars 22A and 22B within the groove 26. The gibs 23A, 23B are made from a stiff material such as an aluminum-bronze extruded bar stock sold under the registered trade mark 'Ampco 18' by Ampco Metal S. A. Corp of Switzerland (i.e. Young's Modulus of about 117 GPa). When the connecting bars 22A and 22B are moved along the groove 26, a corresponding movement of the slide bars 21A and 21B, linked thereto, between the in-mold and the out-mold positions, causes the neck rings 20A and 20B, respectively, to move between an open and a closed configuration. The connecting bars 22A and 22B are moved along the channel by a cam arrangement, not shown, or by any other suitable means that may be apparent to those skilled in the art. The wear plates 27, 28 between the slide bars 21A and 21B and the stripper plate 25 separate the stripper plate 25 from the slide bars 21A and 21B to prevent wear of the confronting surfaces of the slide bars 21A and 21B and stripper plate 25. However, the existence of this wear plate 27, 28 does not provide for a reliable application of clamping force between the slide bars 21A and 21B and the stripper plate 25 once the wear plate becomes worn.

SUMMARY OF THE INVENTION

An embodiment of the present invention mitigates the foregoing problems, at least in part.

In accordance with a first aspect of the present invention, there is provided an injection mold including a mold base having a confronting surface, a slide member having a complementary confronting surface, and a connecting structure slidably linking the slide member to the mold base for movements thereof between an out-mold and a in-mold position. The connecting structure is further configured to maintain a gap between the confronting surfaces during at least a portion of the movement of the slide member between the out-mold and the in-mold positions so that wearing of the confronting surfaces is reduced.

A technical effect of the present invention is to reduce wearing between the slide member and the mold base.

BRIEF DESCRIPTION OF THE DRAWINGS

A better understanding of the exemplary embodiments of the present invention (including alternatives and/or variations thereof) may be obtained with reference to the detailed description of the exemplary embodiments along with the following drawings, in which.

The drawings are not necessarily to scale and are sometimes illustrated by phantom lines, diagrammatic representations and fragmentary views. In certain instances, details that are not necessary for an understanding of the embodiments or that render other details difficult to perceive may have been omitted.

DETAILED DESCRIPTION OF THE PREFERRED EMBODIMENT(S)

Figure 3:
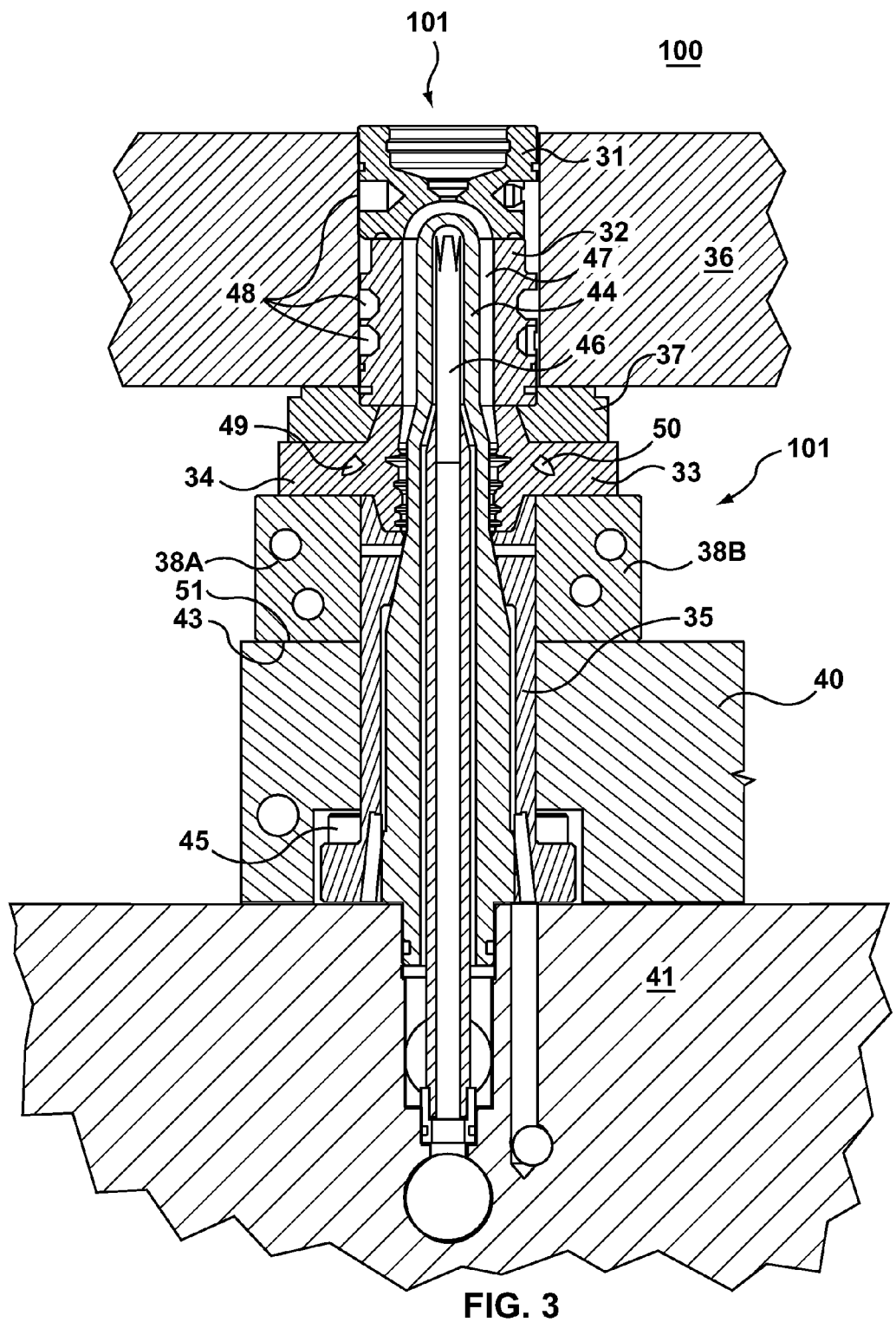
FIG. 3 is a cross sectional view of a mold in accordance with a first embodiment in a mold-closed position.
Figure 4:
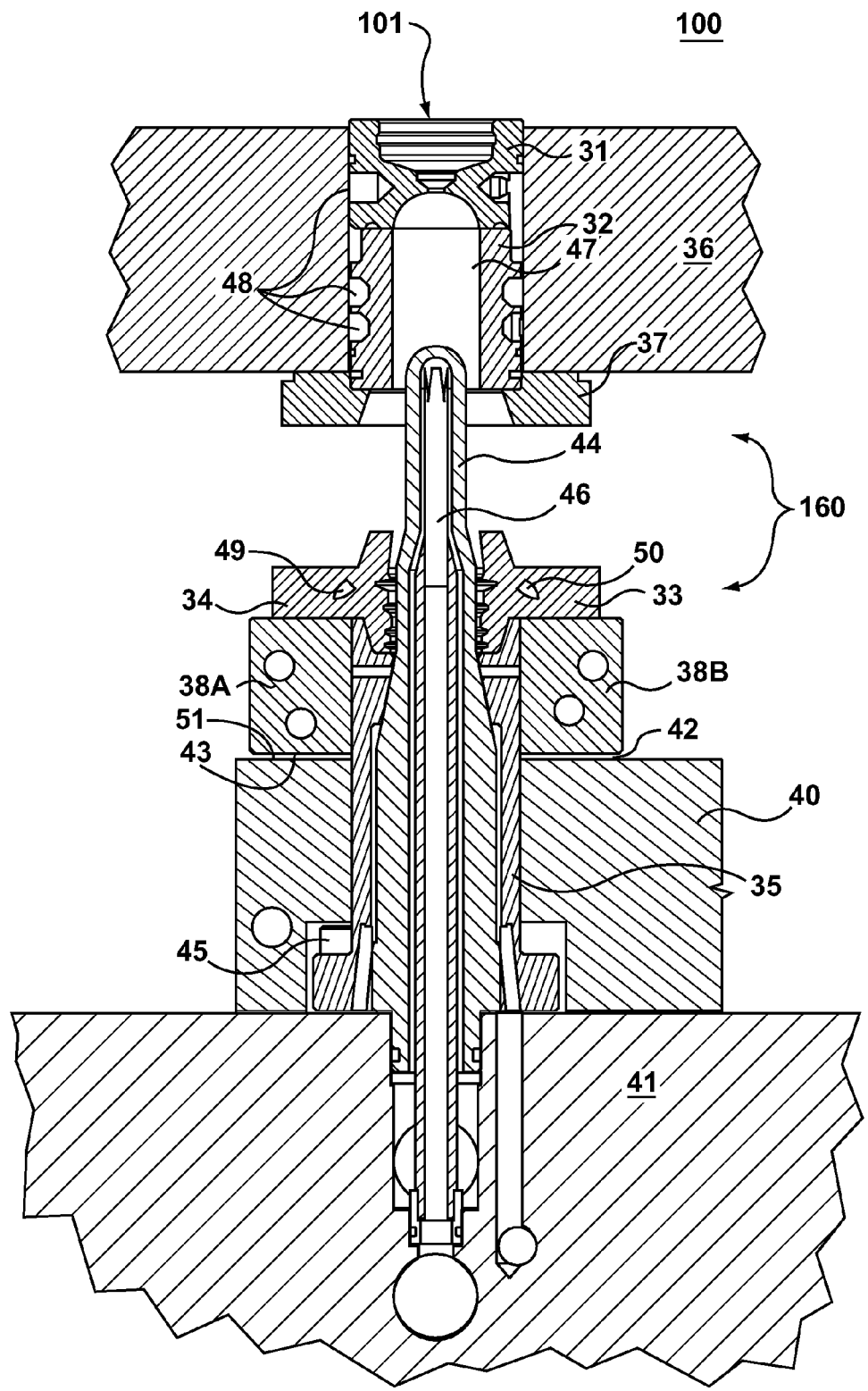
FIG. 4 is a cross sectional view through the mold of FIG. 3 in a mold-open position.
Figure 5:
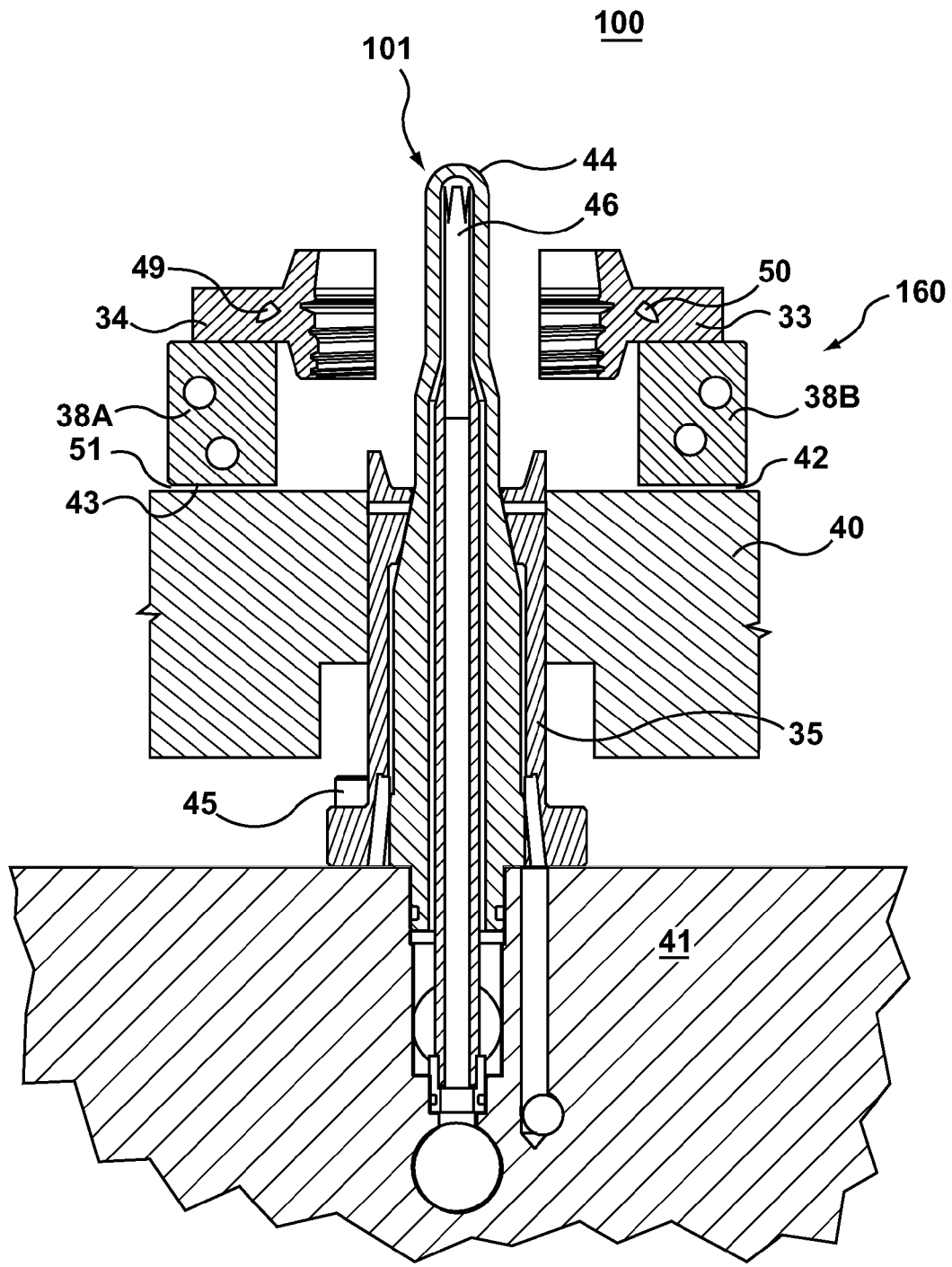
FIG. 5 is a cross sectional view through the mold of FIG. 3 with the mold fully open and neck rings separated.

FIGS. 3, 4 and 5 illustrate the presently preferred states of operation of a mold 100 configured in accordance with the first embodiment (which is the preferred embodiment).

FIG. 3 shows the mold in the closed position ready for injection of the plastic into the mold. The mold includes a mold base 160 that includes a molding stack 101. The mold base 160 includes a core plate 41, a stripper plate 40, and a cavity plate 36. The stack 101 includes a mold core 44 fitted into the core plate 41 and retained therein by a lock ring 35 and bolts 45. The mold core 44 contains a cooling tube 46 for the transmission of cooling fluid from a source within the mold core 44 to remove heat from the injected material in the mold cavity 47 and solidify the molded part in the mold cavity 47. The stack 101 includes a cavity insert 32 and an adjacent gate insert 31 that are retained in the cavity plate 36 by a cavity flange 37 and bolts (not shown). Cooling channels 48 circulate cooling fluid from a source through the cavity insert 32 and gate insert 31 to remove heat from the injected material. The stack 101 includes a pair of molding inserts, such as the neck rings 34 and 33 described hereinbefore, that are mounted to corresponding slide bars 38A and 38B, shown with reference to FIG. 6A, and supported by a stripper plate 40 when the mold is in the closed and clamped position shown in FIG. 3. Cooling channels 49 and 50 circulate cooling fluid from a source through the neck rings 33 and 34 to remove heat from the injected material.

FIG. 3 shows the stack 101 in the closed position. In this position, clamping force can be applied through the stack 101 by means of the gate insert 31, cavity insert 32, neck rings 33 and 34 and lock ring 35 and by means of the cavity plate 36, cavity flange 37, neck rings 33 and 34 and lock ring 35. In addition, because a confronting face 43 of the slide bars 38A and 38B are in firm positive contact with a confronting face 51 of the stripper plate 40, clamping force can also be applied through the neck rings 33 and 34 to the slide bars 38A and 38B and to the stripper plate 40. As the slide bars 38A and 38B are in firm positive contact with the stripper plate 40, the clamping force applied through the slide bars 38A and 38B is applied to the stripper plate 40 and into the core plate 41 to help retain the mold closed during injection.

In the prior art design, where a wear plate separated the slide bars from the stripper plate, any clamping force applied through the slide bars could not be reliably transferred through the stripper plate and into the core plate because wear in the wear plate would, over time, result in an increasing component of the clamping force being directed through the stack.

FIG. 4 shows the stack 101 in a partially open position with no clamping force being applied. The slide bars 38A and 38B are now separated from the stripper plate 40 by a slight gap 42. The manner in which this gap 42 can be achieved will be illustrated and described with reference to the three exemplary embodiments shown in FIGS. 6A, 6B 7A, 7B and 8. Of course, those skilled in the art may on the basis of the foregoing embodiments derive other suitable alternatives.

FIG. 5 shows the stack 101 in the fully open position for releasing a preform, not shown, from the mold cavity 47. As shown in FIG. 5, the slide bars 38A and 38B have retracted the neck rings 33 and 34 while remaining out of contact with the stripper plate 40.

Figure 1:
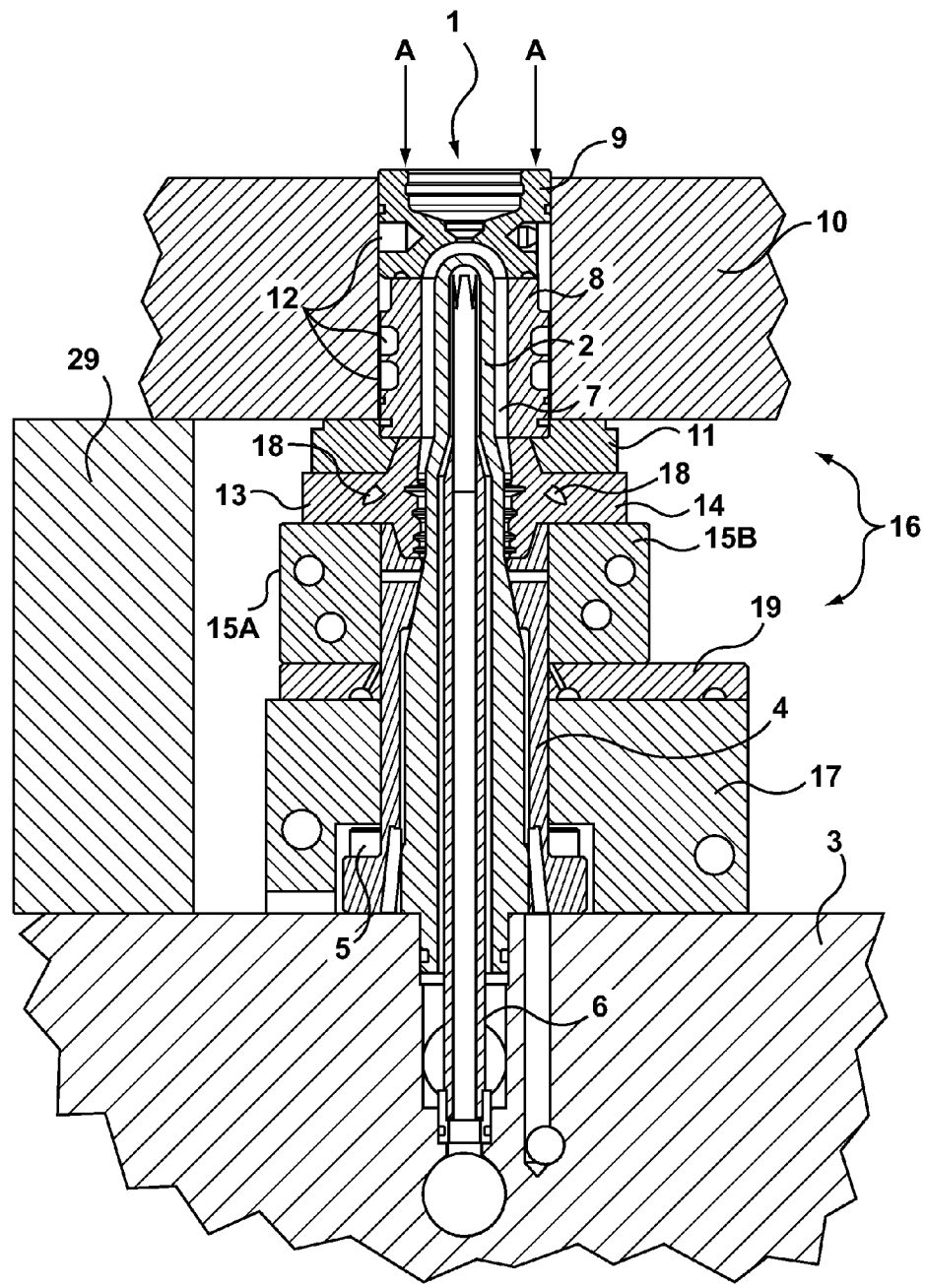
FIG. 1 is a cross sectional view through a known stack of a known injection mold for molding a preform.

In view of the foregoing, and shown with reference to FIGS. 3, 4 and 5, the wear plate 19 and clamping force block 29, shown in FIG. 1, are now preferably omitted.

The mold is operated in the same basic manner as similar molds in the prior art. The operation of these molds is well understood by those knowledgeable in the art of injection molding. Accordingly, a description of the actual operation of the mold is not necessary to a full understanding of the exemplary embodiments and will therefore not be provided herein. Implementation of the embodiments will be fully understood from the illustration and description of the three separate embodiments shown in FIGS. 6A, 6B, 7A, 7B and 8 and fully described hereinafter.

For purposes of illustration the gap between the stripper plate 40 and the slide bars 38A and 38B has been exaggerated. The gap, during periods without an applied clamping force, may in fact approach zero and need only be wide enough to ensure that the slide bars 38A and 38B do not contact stripper plate 40 with any appreciable force during the sliding action thereof to the extent that significant wear is avoided.

FIGS. 6A, 6B, 7A, 7B and 8 illustrate three exemplary embodiments showing how the slide bars 38A and 38B and stripper plate 40 can be held in contact during injection and out of contact when opening the mold.

Figure 6A:
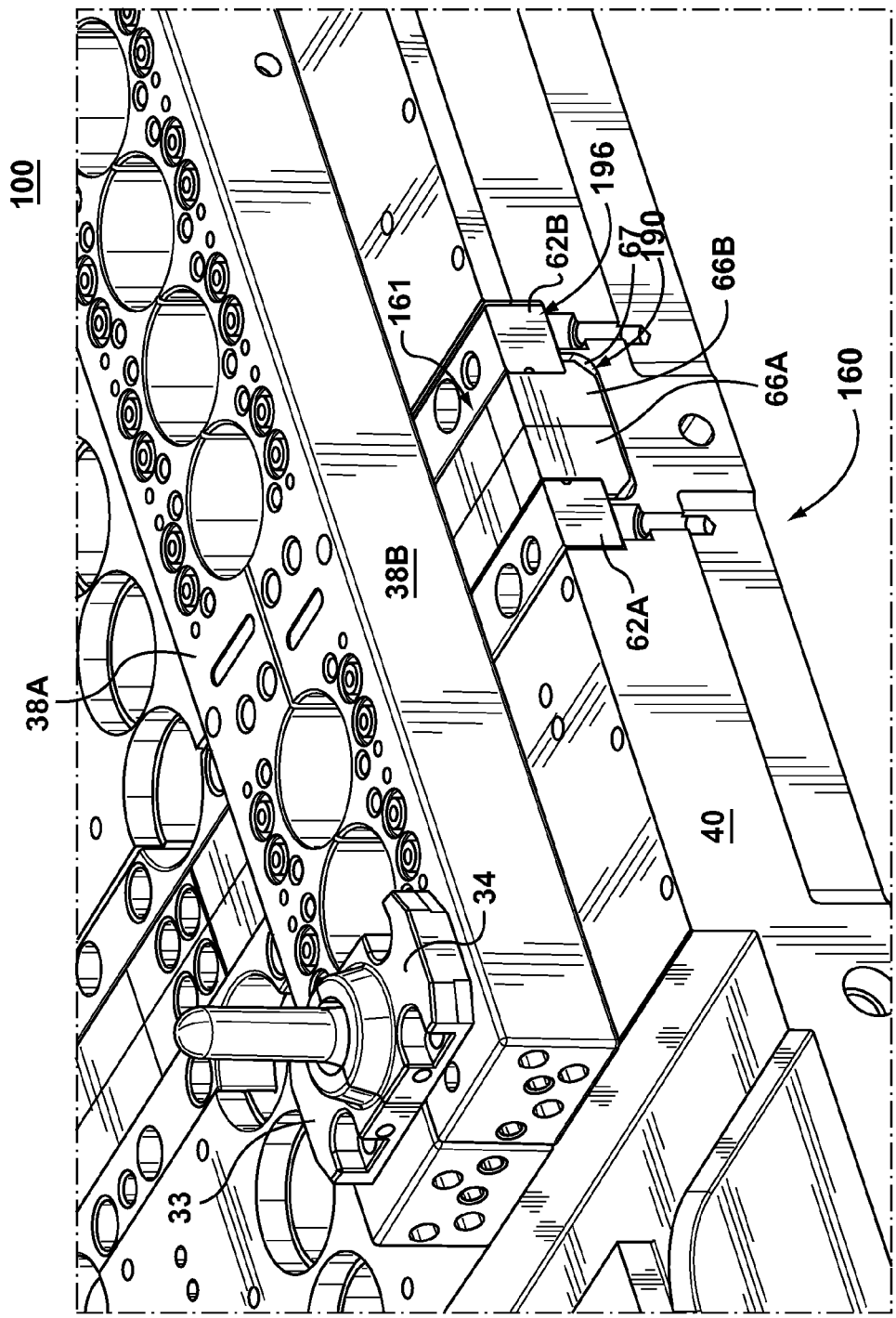
FIGS. 6A and 6B are partial perspective views of the mold of FIG. 3.
Figure 6B:
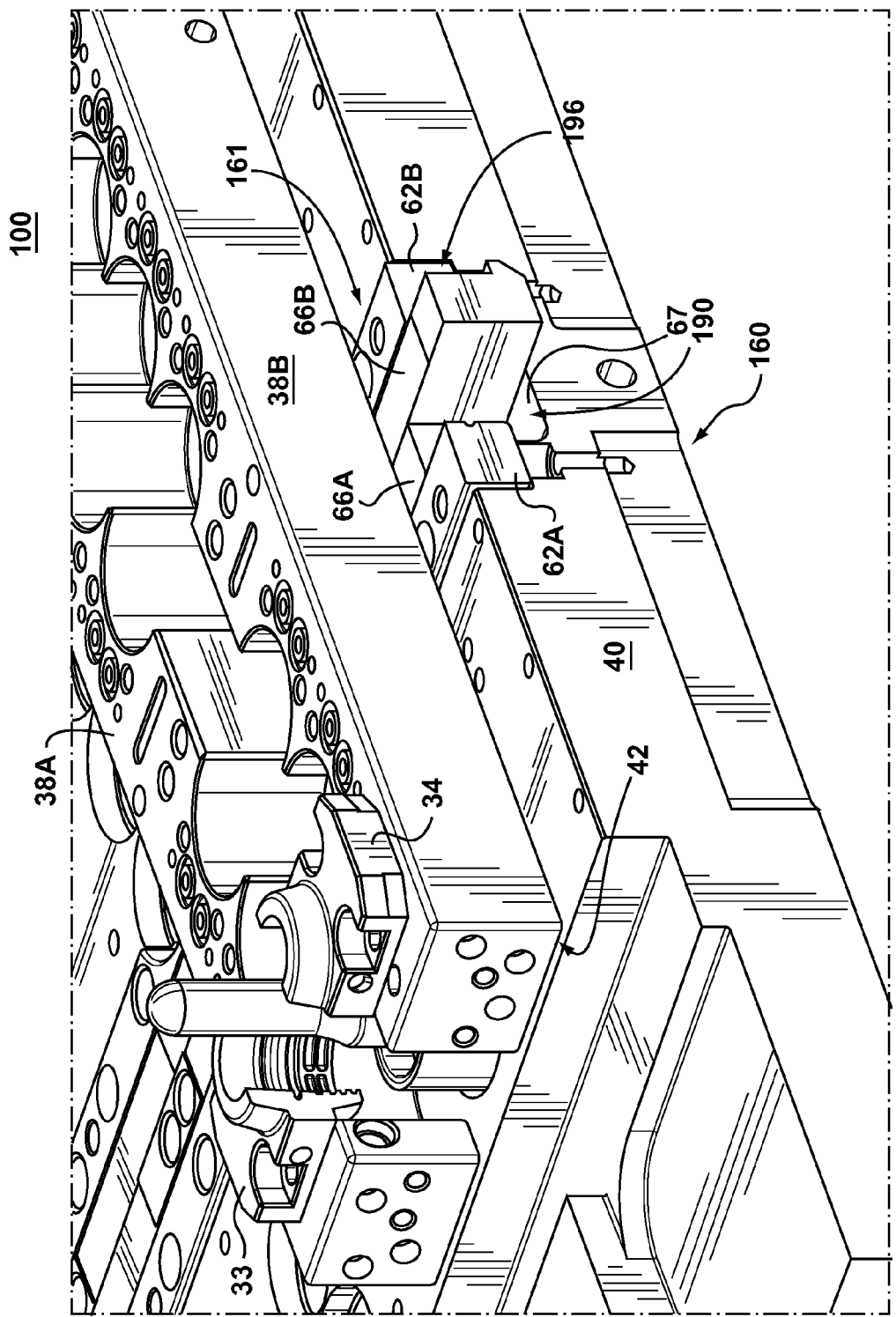

In a similar arrangement to the known mold of FIG. 1, the FIGS. 6A and 6B show the first exemplary embodiment of the mold 100, as including a connecting structure 161 slidably linking a pair of slide members 38A and 38B to a stripper plate 40 of a mold base 160. The connecting structure 161 includes a pair of connecting bars 66A and 66B slidably arranged in a guide that is defined in the mold base 161 between a groove 67 formed in the stripper plate 40 and a pair of gibs 62A and 62B that are linked thereto. The gibs 62A and 62B are preferably made of an elastic material such as a nylon block. The selected material preferably offers high load bearing capabilities, good strength and wear resistance and a low coefficient of friction. A nylon product such as is sold under the registered trade mark 'Nylatron', a registered trade mark of Quadrant DSM Engineering Plastic Products, may be suitable for use as gib material as it has the requisite strength and elasticity (i.e. Young's Modulus of about 2.76 GPa). Accordingly, when clamping force is applied, the gibs 62A and 62B can be compressed sufficiently to enable the slide bars 38A and 38B to come into contact with the stripper plate 40 and enable the transfer of clamping force through the slide bars 38A and 38B and into the stripper plate 40. When the clamping force is removed, the gibs 62A and 62B decompress and lift the slide bars 38A and 38B out of contact with the stripper plate 40 to form a gap 42 as shown in FIG. 6B and thus enable slide bars 38A and 38B to separate and open neck rings 33 and 34 and release a molded part.

Accordingly, and in view of the typical properties of Nylon, the gap is preferably selected to be in the range between 0.5-3% of a thickness of the gib 62A and 62B and more ideally is in the range of between 2 and 2.5%.

Notwithstanding the foregoing, the gap is preferably selected to be in the range between 0.1 and 2.0 mm and more ideally is in the range of between 0.4 mm and 0.5 mm.

Figure 7A:
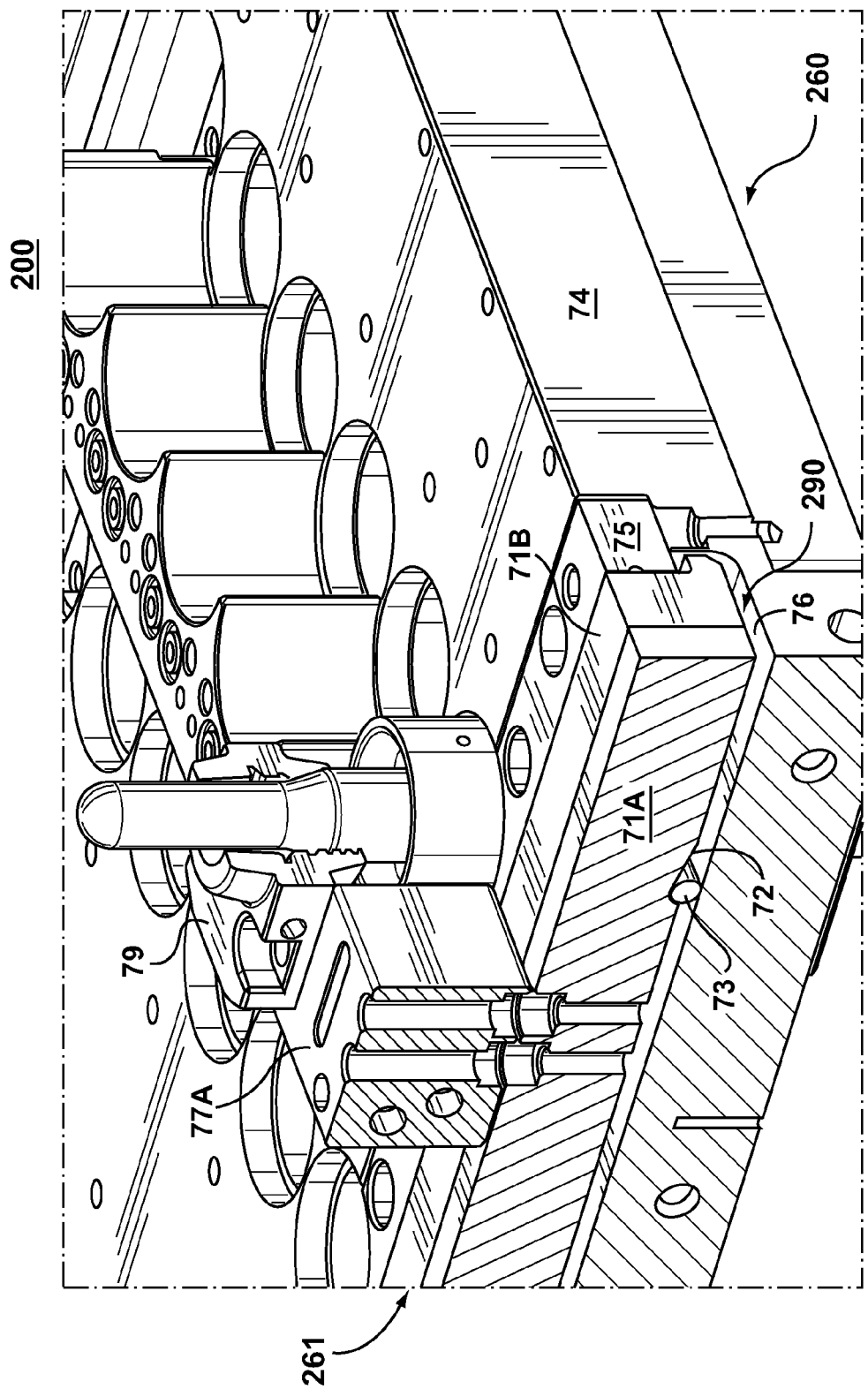
FIGS. 7A and 7B are partial perspective views of a mold in accordance with a second embodiment.
Figure 7B:
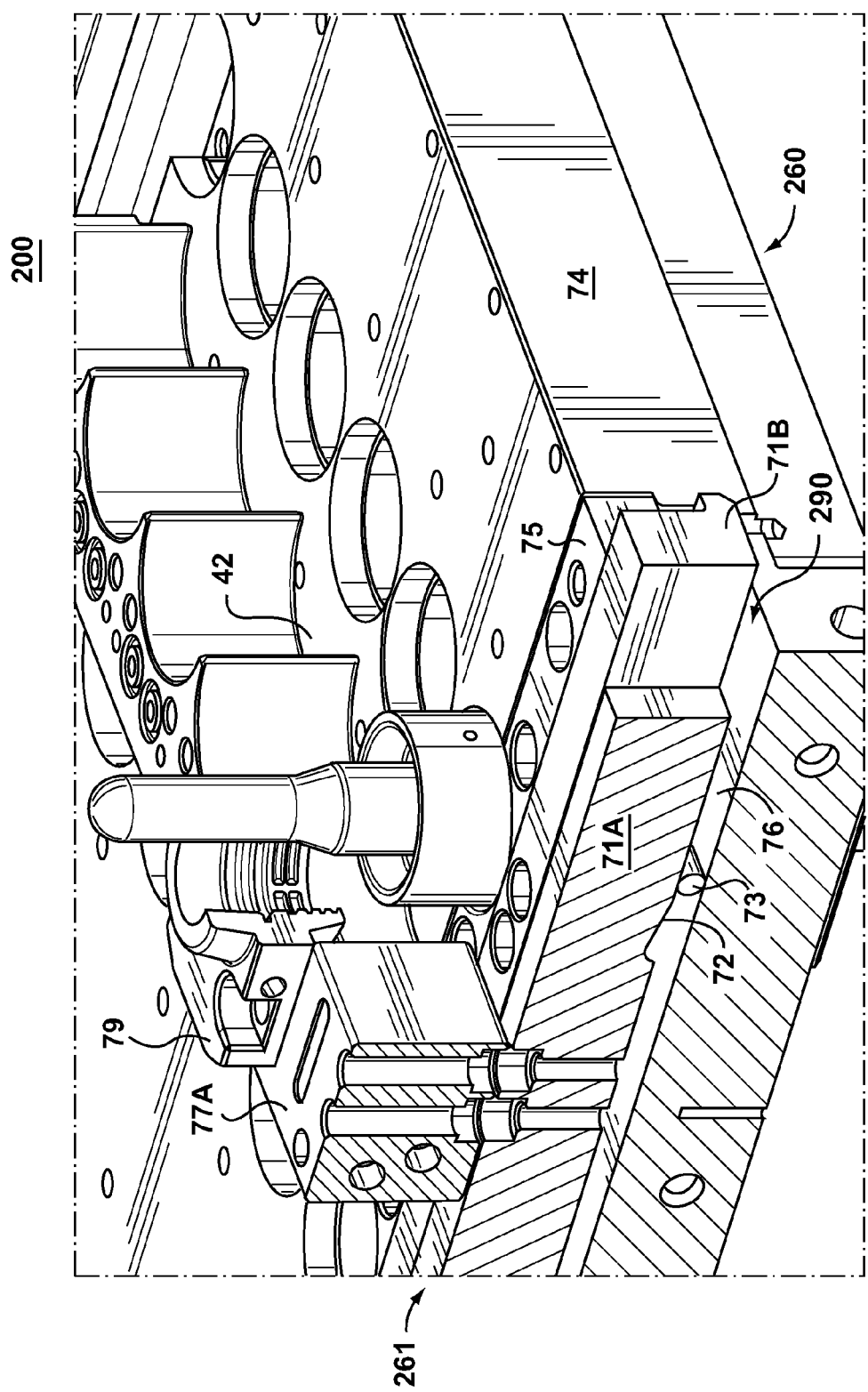

In accordance with a second embodiment, a mold 200 is shown in which the gap may be controlled using a connecting structure 261, of a mold base 260 that includes a cam arrangement as shown in FIGS. 7A and 7B. To simplify the drawings, only one cam roller is shown, FIG. 7A shows schematically, a partial section of a portion of the mold in the closed position. FIG. 7B shows, schematically, a partial section of the mold portion in the open position. In FIGS. 7A and 7B, the connecting bar 71A has a cam surface 72 that cooperates with a cam roller 73 affixed to stripper plate 74. Connecting bar 71B has a similar cam arrangement that cannot be seen in the drawing as illustrated in FIGS. 7A and 7B. Gib 75 confines connecting bar 71B to the groove 76. A second gib would similarly confine connecting bar 71A to groove 76. Slide bar 77A is firmly attached to connecting bar 71A and slides over stripper plate 74 when connecting bar 71A reciprocates within groove 76. As cam surface 72 travels over cam roller 73 to the position shown in FIG. 7B, a gap 42 is created between slide bar 77A and stripper plate 74. Initially the gap 42 is small but sufficient to prevent wearing contact between the slide bar 77A and the stripper plate 74. When the connecting bar 71A has completed travel to fully open the slide bar 77A and associated neck rings such as neck ring 79, the gap between the stripper plate 74 and slide bar 77A can be substantial. A similar arrangement of cam roller, cam surface and slide bar is associated with connecting bar 71B to permit separation of neck rings on the opposite side of the cavity to neck ring 79.

With the use of the cam roller 73, the gap between the stripper plate 74 and slide bar 77A is preferably selected to be in the range of 0.1 mm to 10 mm but, is preferably kept within the range of 0.4 mm and 0.5 mm.

Figure 2:
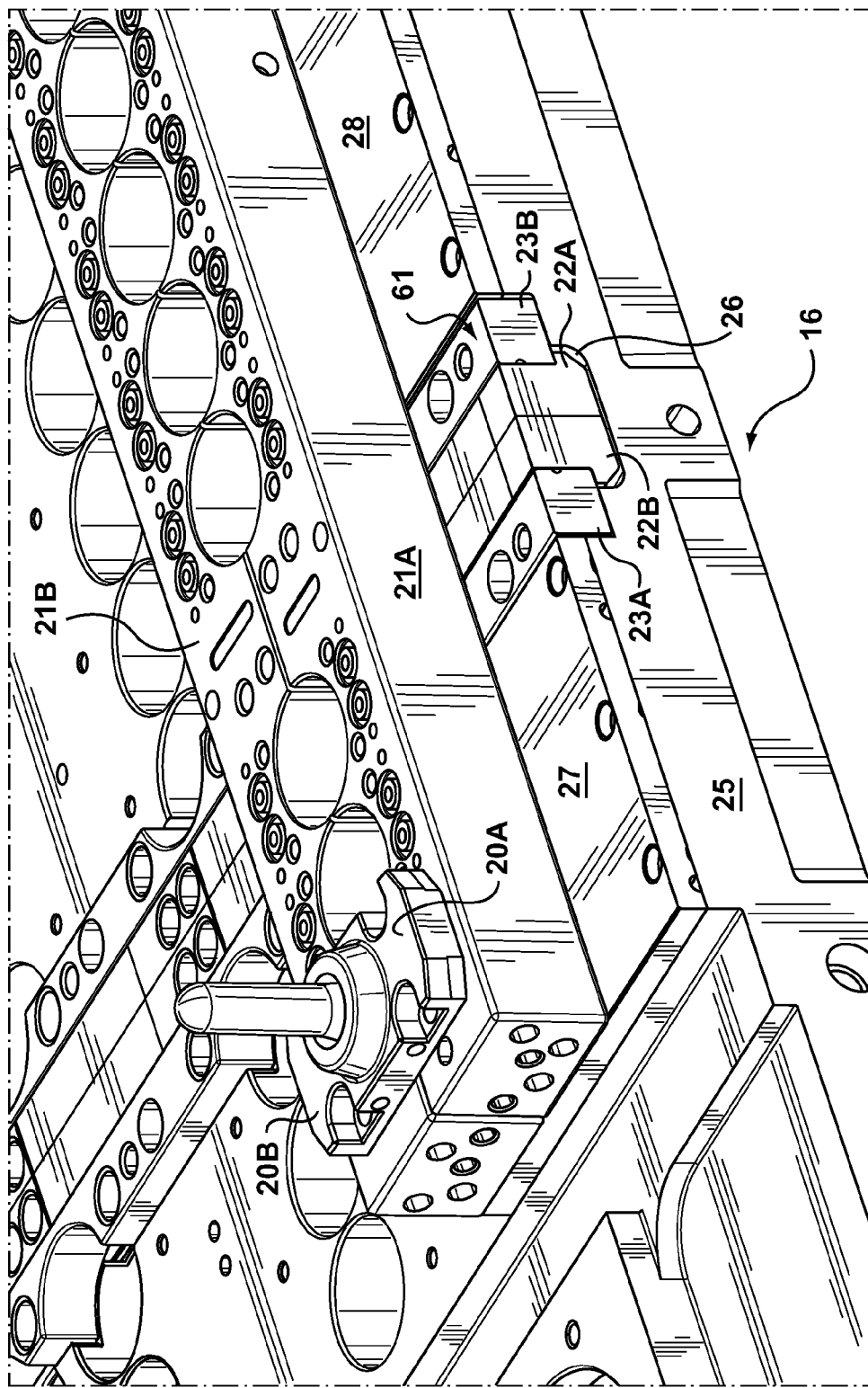
FIG. 2 is a partial perspective view of a known slide bar and a known stripper plate assembly.
Figure 8:
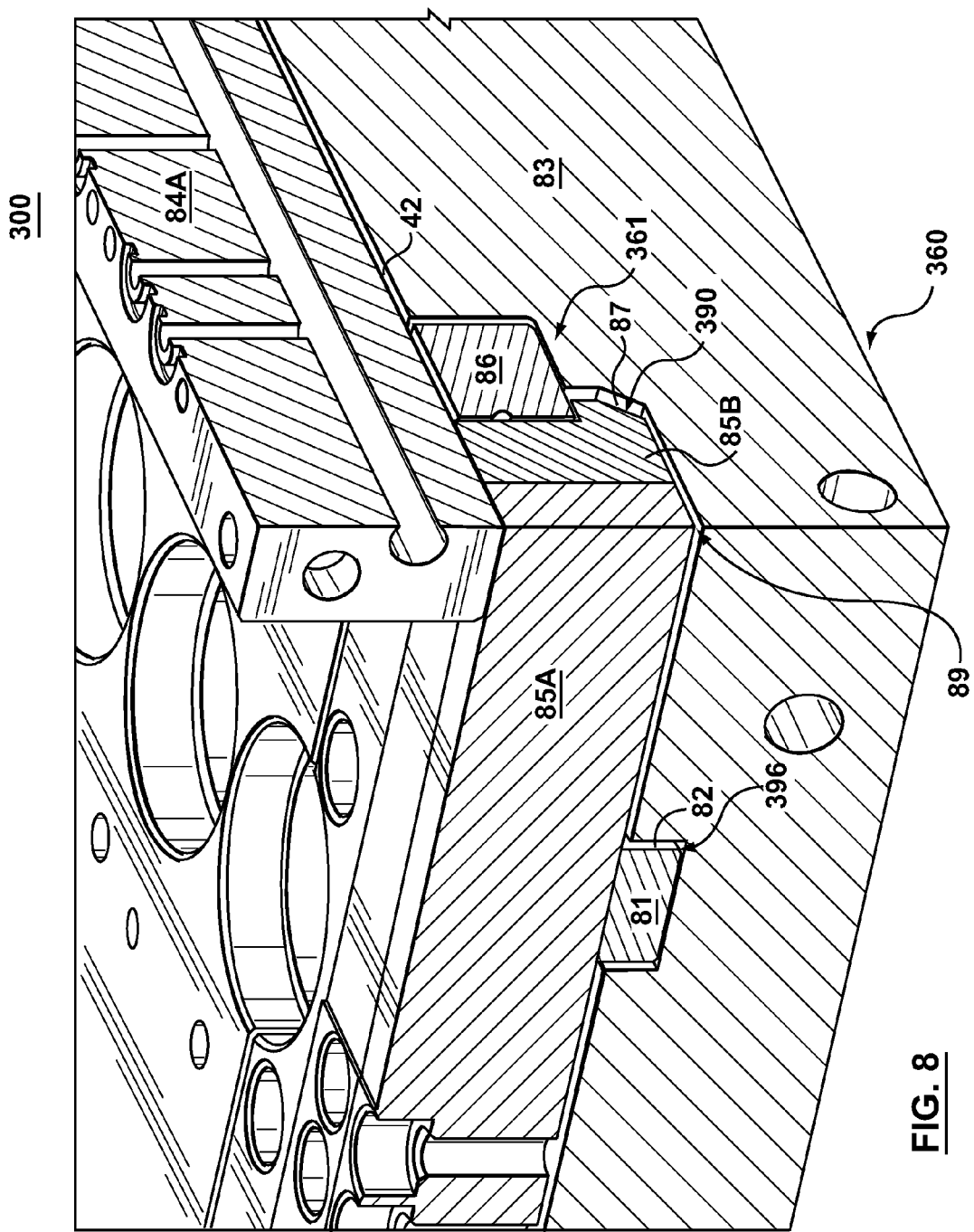
FIG. 8 is a partial sectional view of a mold in accordance with a third embodiment.

FIG. 8 is a schematic view of a mold 300 in accordance with a third exemplary embodiment. In FIG. 8, a connecting structure 361, of a mold base 360, includes a compressible elastic pad 81 that is confined within a slot 82 in the surface of the stripper plate 83. Under clamping force the pad 81 is compressed to a level even with the surface of the stripper plate 83 thus enabling a firm and positive contact between the confronting surfaces of the slide bar 84A and the stripper plate 83 when clamping force is applied to the mold. As shown in FIG. 8, a single elastic pad 81 is shown located between the connecting bar 85A and the stripper plate 83. The gib 86 confines the connecting bar 85A to the groove 87 as has been described with reference to the prior art as shown in FIGS. 1 and 2. FIG. 8 shows the pad 81 in a decompressed state so that a gap 42 separates the slide bar 84A from the stripper plate 83 and a gap 89 separates connecting bars 85A and 85B from stripper plate 83. When the slide bar 84A is in position to close the neck rings and the mold is closed, clamping force can be applied and compress the pad 81 to close the gap 42 and enable clamping force to be applied through the slide bars such as slide bar 84A and stripper plate 83.

In practice, any suitable number of pads could be provided and could be located in the stripper plate, connecting bar or even the slide bars themselves. The sole criteria is that the pads are compressed under clamping force and reliably return to a non-compressed state supporting and separating the connecting bars and slide bars from the stripper plate when clamping force is removed.

In accordance with another embodiment, not shown, the injection mold may be configured to include a slide member for performing a further operation that may include: removing a molded article from a molding cavity of the mold; placing an insert in the molding cavity; or exercising a portion of the molded article.

The selection of a particular embodiment may be determined by the materials available and the operating clamping forces required.

The above description has been given by way of example only and that modifications in detail may be made. For example, while the embodiments have been described in terms of replacing the aluminum bronze gibs with a compressible elastic nylon rod, other materials having similar properties of compressibility, strength and elasticity could be used. Similarly, those skilled in the art may easily arrive at substitute means for biasing the slide bars that are also within scope of the claimed invention. For example, a prior art gib may be slidably arranged on the stripper plate, in the direction of the applied clamping force, and further include a spring arranged therebeneath such that the slide member is biased away from the stripper plate in much the same way as described hereinbefore.

Figure 9:
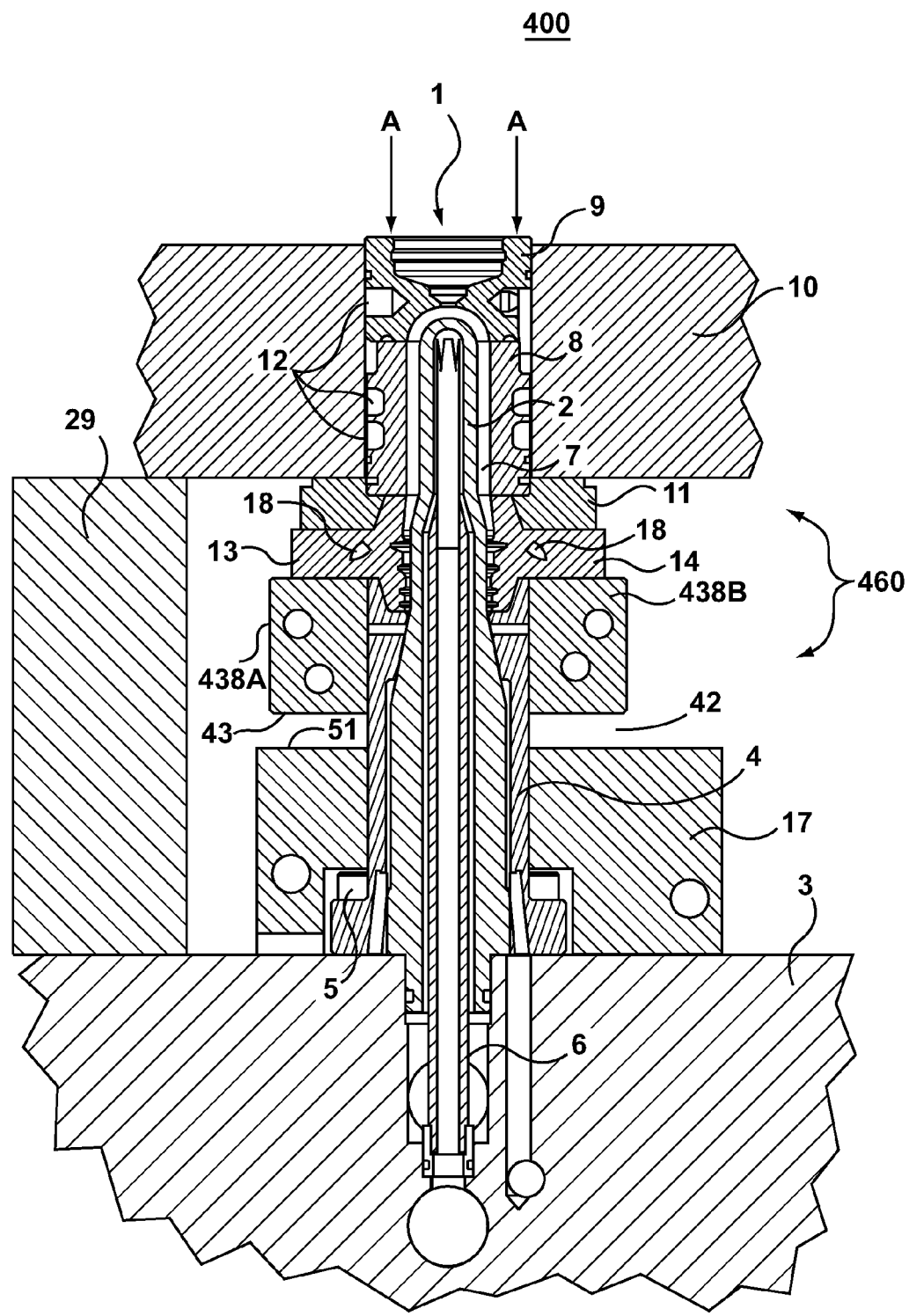
FIG. 9 is a cross-sectional view of a mold according with a fourth embodiment.

FIG. 9 is a cross-sectional view of a mold 400 in accordance with a fourth exemplary embodiment. The fourth exemplary embodiment is configured to include a connecting structure (not shown) that is similar to the connecting structure 161 of the first exemplary embodiment as described hereinbefore and shown with reference to FIGS. 6A and 6B. In particular, the connecting structure includes gibs (not shown) that are configured to provide a slight gap 42 between the confronting surfaces 43 and 51 of the slide bars 438A and 438B and stripper plate 17 when the mold is open. However in contrast to the first exemplary embodiment, the mold is otherwise configured to avoid significant compression of the gibs (not shown) and instead directs the clamping force through the stack 1, and optionally through a clamping force block 29, whereby at least some amount of the gap 42 is maintained while the mold is configured to be closed and clamped (as shown). Accordingly, the gibs (not shown) are preferably made from typical wear resistant materials such as Ampco, by Ampco Metal S. A. Corp of Switzerland. In so doing, the gibs (not shown) essentially replace the expensive wear plates of the prior art.

Figure 10:
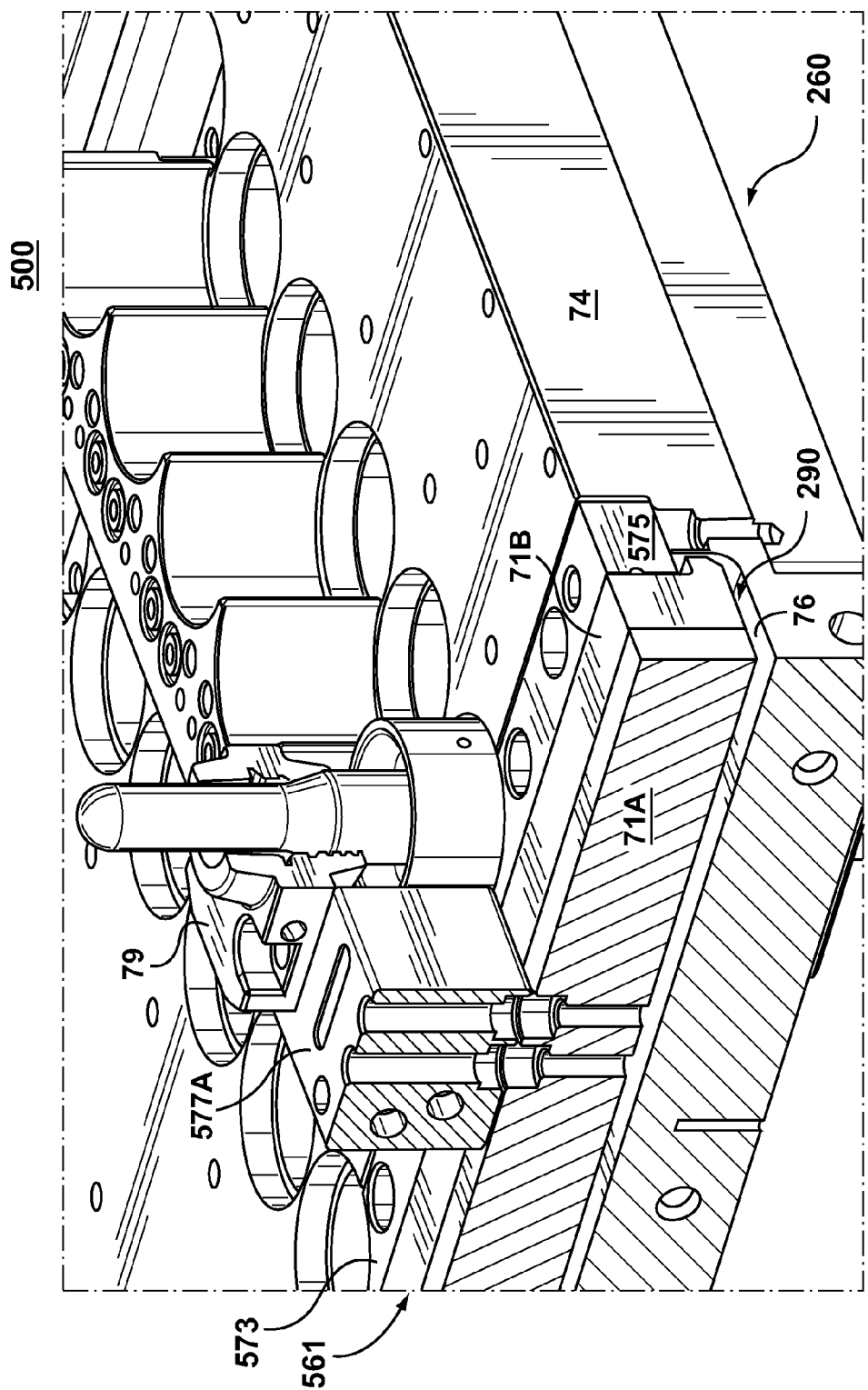
FIG. 10 is a partial perspective view of a mold in accordance with a fifth embodiment.

In accordance with a fifth exemplary embodiment, a mold 500 is shown in which the gap may be controlled using a connecting structure 561, of a mold base 260 that includes a cam arrangement as shown in FIG. 10. The cam arrangement is similar to the second embodiment shown in FIGS. 7A and 7B except that the cam surface 573 is provided along an inclined portion of a top surface of the gib 575 and the cam follower, not shown, is preferably provided along a similarly inclined surface formed through the confronting surface on the bottom of the slide 577A. As the cam follower surface, not shown, travels over the cam surface 573, as the slide moves between an in-mold and out-mold positions, a gap 42 is created between slide bar 577A and stripper plate 74.

Figure 11:
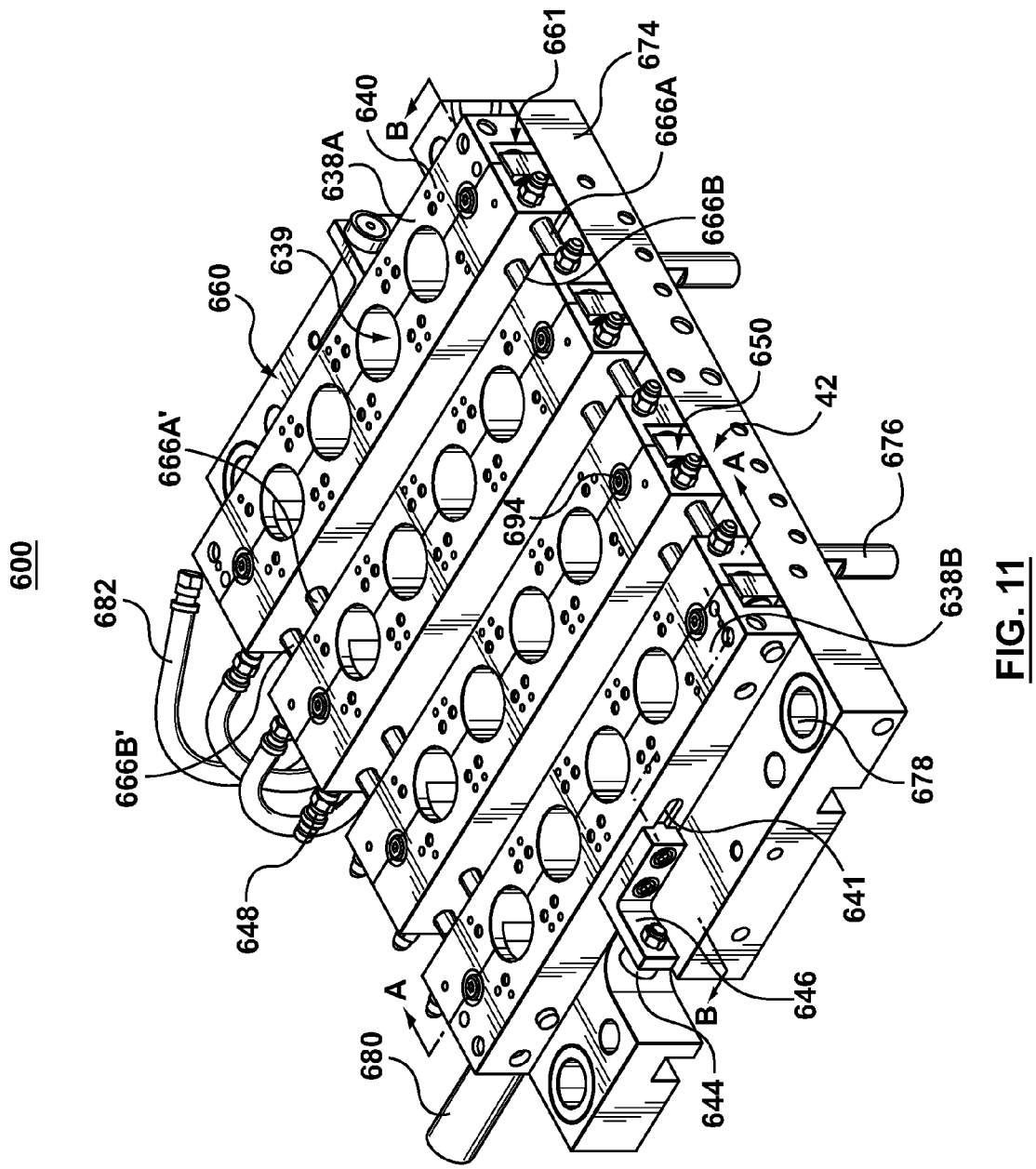
FIG. 11 is a perspective view of a stripper assembly of a mold in accordance with a sixth embodiment.

With reference to FIG. 11, a stripper plate assembly of a mold 600 in accordance with a sixth exemplary embodiment is shown. The stripper plate assembly includes a mold base 660 and a connecting structure 661. The connecting structure 661 is similar to the connecting structures described hereinbefore for providing a slight gap 42 between confronting surfaces 43 and 51 (FIG. 15) of a stripper plate 674 and slide members 638A and 638B, respectively, responsive to the opening of the mold 600, the gap 42 closing responsive to a closing of the mold 600, or with the further application of a mold clamping force. Advantageously, but not a necessity, a clamping force may be transferred across the confronting faces 43 and 51 when the mold 600 is closed. The connecting structure 661 is otherwise operable for movement of the neck rings (not shown) between an in-mold and an out-mold position, as described hereinbefore.

In the exemplary embodiment, the connecting structure 661 links four complementary pairs of slide members 638A, 638B to the mold base 660. Each slide members 638A, 638B, generally consists of a rectangular bar member. A bottom face of the bar provides the confronting face 51. Each slide member 638A, 638B, includes a plurality of mounting interfaces 640 configured along a top face of the bar for receiving the neck rings (not shown). Each slide member 638A, 638B, also includes a plurality of openings 639 passing between the top face and the bottom face of the bar for accommodating both the neck rings (not shown) and the cores (not shown). Each slide member 638A, 638B, also includes a set of passages 637, 639 (FIG. 15) extending between the sides of the bar, in proximity to each end of the bar, for receiving corresponding pairs of connecting members 666A, 666B. The connecting members 666A, 666B link corresponding slide members 638A, 638B of the four pairs of slide members 638A, 638B together as will be explained in detail hereinafter. Each slide member 638A, 638B, also includes a coolant channel 638 (FIG. 15) extending through the bar for providing a coolant to the neck ring mounting interface 640. Fittings 648 provided at interfaces to the coolant channel 638, at the ends of the bar, connect the coolant channel 638 to corresponding coolant channels (not shown) provided in the stripper plate 674 via hoses 682. Each slide member 638A, 638B also includes a pocket 645 (FIG. 12) formed through the bottom face at the base of the bar, in proximity to each end thereof, for accommodating a gib 650, as explained hereinafter. The outermost slide members 638A, 638B, of the four pairs of slide members 638A, 638B, are configured to include an actuator interface 641 (alternate actuator interface 641' shown with reference to FIG. 12) for cooperation with a slide member actuator. In the present embodiment the slide member actuator includes a bracket 646, a cam follower 644, and a cam (not shown). Alternatively, the slide member actuator could include any one of a variety of actuators such as pneumatic, hydraulic, electromechanical, and the like.

Figure 15:
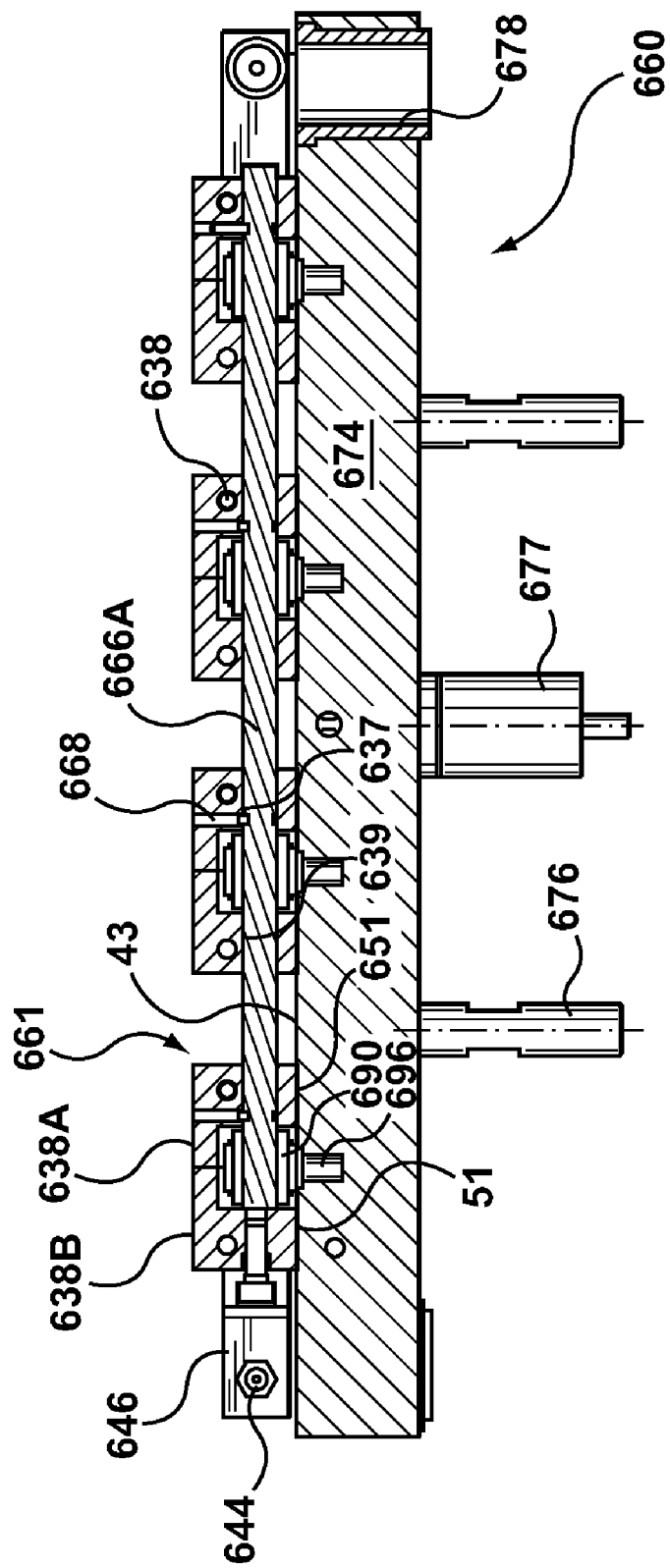
FIG. 15 is a cross-sectional view of the stripper assembly of FIG. 11 along line B-B.

With reference to FIG. 15, within each set of the passages 637, 639, of the slide members 638A, 638B, the first passage 637 is preferably configured to fit relatively closely around the outer surface of the connecting members 666A, 638B relative to the second passage 639 which is configured to provide a small clearance. In this way, the first passage 637, preferably in cooperation with a retainer 668, such as a set screw, prevents relative motion between the slide member 638A, 638B and the corresponding connecting member 666A, 666B thereby linking respective slide members 638A, 638B of the four pairs of slide members 638A, 638B together.

Likewise, the second passage 639 allows for relative motion between the slide members 638A, 638B and non-corresponding connecting member 666A, 666B.

Figure 14:
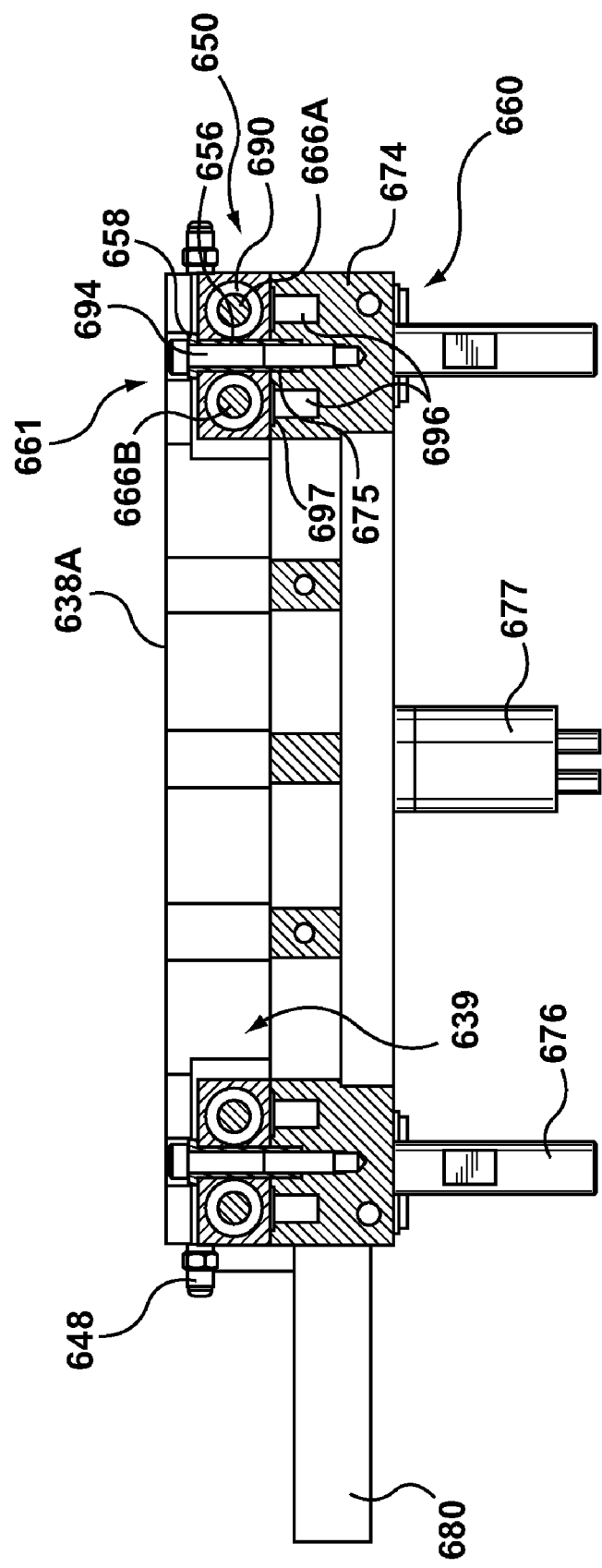
FIG. 14 is a cross-sectional view of the stripper assembly of FIG. 11 along line A-A.

The mold base 660 includes the stripper plate 674. The mold base 660 also includes leader pin bushings 678, a mold foot 680, and ejector linkages 676, 677 (FIGS. 14 & 15). The leader pin bushings are for cooperating with leader pins (not shown) for aligning the stripper plate assembly of the mold base 160 with other members (not shown) of the mold base 160. The mold foot 680 cooperates with other mold feet (not shown) for supporting the mold base 660 when the mold 600 is outside of the injection molding machine (not shown). The ejector linkages 676, 677 are for linking the stripper plate 674 with an ejector mechanism in the molding machine for movement of the stripper plate assembly relative to the other members (not shown) of the mold base 160.

Figure 12:
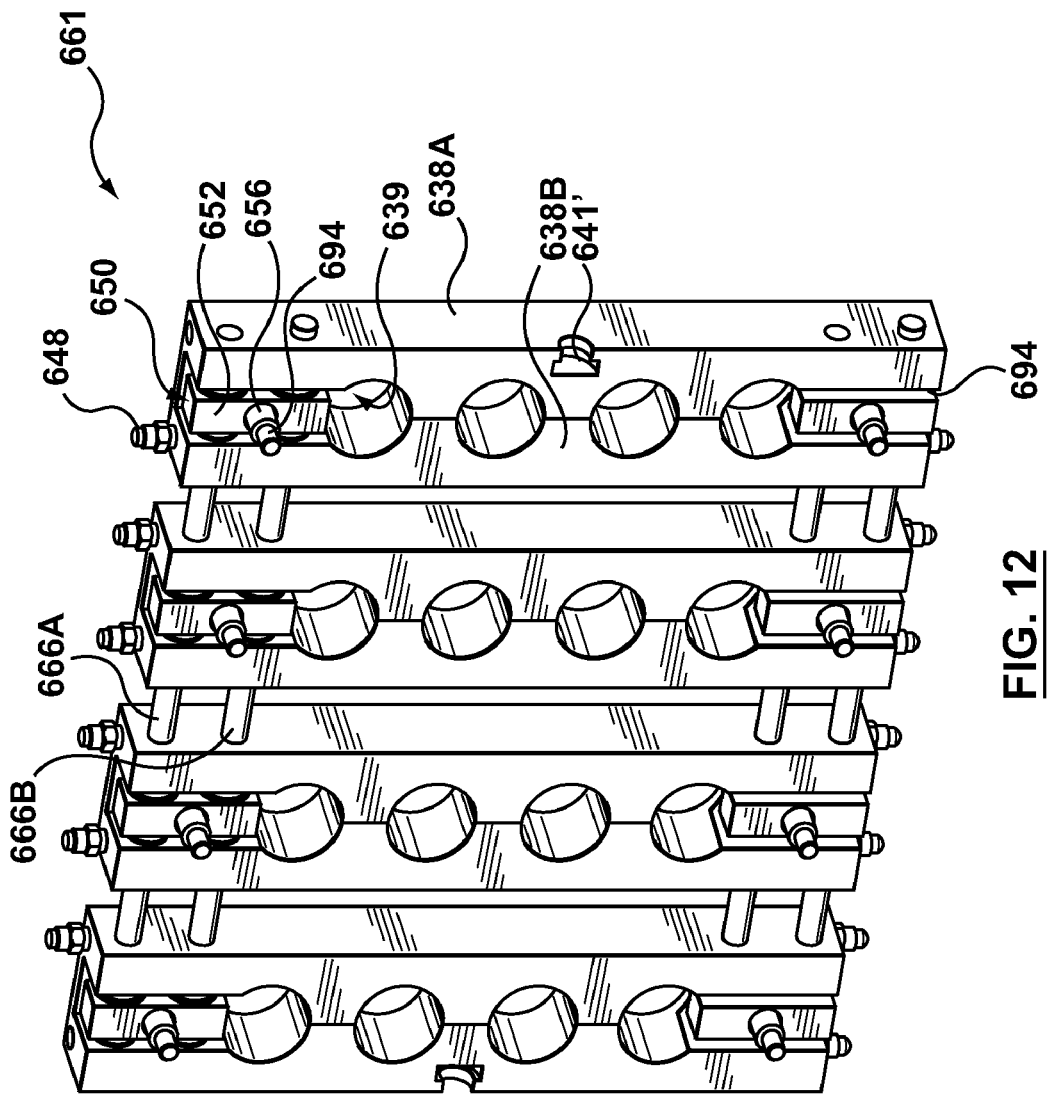
FIG. 12 is a perspective view of a connecting structure of the stripper assembly of FIG. 11.
Figure 13:
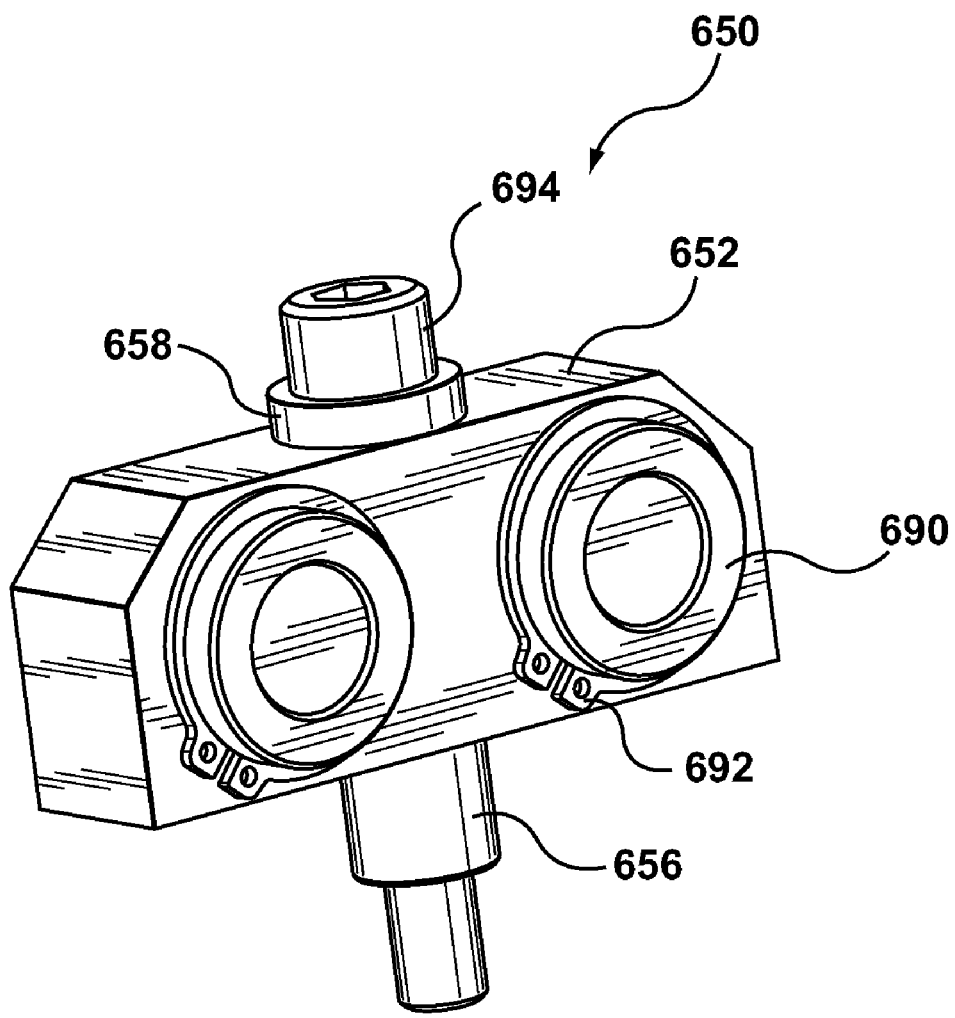
FIG. 13 is a partial perspective view of a gib of the connecting structure of FIG. 12.

With reference to FIG. 12, a bottom view of the connecting structure 661 linking the slide members 638A, 638B reveals the arrangement of the gibs 650 within the pockets 645 as provided in the base of the slide members 638A, 638B. With further reference to FIG. 13, each gib 650 includes a block 652 through which a tubular bushing 656 is slidably arranged. A flange 658 provided at an end of the bushing 656 provides an upper stop to limit the travel of the block 652. With reference to FIG. 14, the travel of the block is otherwise limited by a lower stop provided by a top surface of the stripper plate 674. Again with reference to FIG. 14, the portion of the bushing 656 that is shown extending through the block 652 is received within a complementary bore 675 provided through a top portion of the stripper plate 674. The depth of the bore 675 relative to the maximum extent to which the bushing 656 may extend through the block 652 (when the block is at its upper limit against the flange 658) is established such that the block 652 has a limited degree of freedom to slide (stroke) vertically on the bushing between the limits. The stroke is preferably about 0.1 mm but the amount may be more or less. The block 652 otherwise includes a pair of guides 690, such as linear bearings, retained therein by retainers 692. The guides 690 are configured to cooperate with an outer surface of the connecting members 666A, 666B to accommodate a sliding of the connecting members 666A, 666B towards and away from one another to provide for the opening and closing of the neck rings (not shown). Accordingly, the connecting members 666A, 666B are preferably cylindrical rods, such as linear rails.

With reference to FIG. 14, the connecting structure 661 further includes compressible members 696, such as die springs, air springs, pneumatic actuator, and the like, set into bores provided beneath each end of the block 652. The compressible members 696 act to urge the block 652 against the upper stop, and in this way urge the interconnected slide members 638A, 638B upwardly to form the gap 42 between the confronting surfaces 43 and 51 when the mold 600 is open. Alternatively, the compressible member may include a pair of o-rings (not shown) arranged in seats 697 configured between the stripper plate 674 and the block 652.

The description of the exemplary embodiments provides examples of the present invention, and these examples do not limit the scope of the present invention. It is understood that the scope of the present invention is limited by the claims. The concepts described above may be adapted for specific conditions and/or functions, and may be further extended to a variety of other applications that are within the scope of the present invention. Having thus described the exemplary embodiments, it will be apparent that modifications and enhancements are possible without departing from the concepts as described. Therefore, what is to be protected by way of letters patent are limited only by the scope of the following claims.

What is claimed is:

1. An injection mold, comprising:
   a mold base having a confronting surface;
   a slide member having a complementary confronting surface;
   a connecting structure slidably linking the slide member to the mold base for a movement of said slide member between an out-mold position and an in-mold position;
   the connecting structure further configured to maintain a gap between the confronting surface and the complementary confronting surface during at least a portion of the movement of the slide member between the out-mold position and the in-mold position so that wearing of the confronting surface and the complementary confronting surface are reduced;
   the connecting structure is further configured to enable a positive contact between the confronting surface and the complementary confronting surface in response to an applied clamping force between the slide member and the mold base;
   wherein the connecting structure includes:
      a connecting member connected to the slide member;
      a gib having a block through which a tubular bushing is slidably arranged;
      the tubular bushing having a flange that provides an upper stop to limit a travel of the block;
      a portion of the tubular bushing received within a complementary bore defined through a top portion of a plate, of the mold base, to a depth that permits the block a limited degree of freedom to slide on the tubular bushing between the upper stop and a lower stop provided by a top surface of the plate;
      a guide arranged in the block, the guide configured to cooperate with the connecting member to accommodate a sliding of the connecting member;
      a compressible member arranged between the mold base and the block to urge the block against the upper stop and in this way urge the slide member upwardly to form the gap.

2. The injection mold of claim 1, wherein the connecting structure is configured to maintain at least a portion of the gap when the slide member is arranged in the in-mold position.

3. The injection mold of claim 1, wherein the slide member is configured for receiving a molding insert for defining a molding cavity in the injection mold.

4. The injection mold of claim 1, wherein the slide member is configured for performing a further operation, wherein the further operation includes at least one of:
   removing a molded article from a molding cavity of the injection mold;
   placing an insert in the molding cavity;
   exercising a portion of the molded article.

5. The injection mold of claim 1, wherein the gap between the confronting surface and the complementary confronting surface is between 0.1 mm and 2.0 mm.

6. The injection mold of claim 1, wherein the connecting structure includes:
   a guide linked to said mold base configured for slidably receiving the connecting member.

7. The injection mold of claim 6, wherein the guide is defined between a surface of a groove formed in the mold base and a surface of the gib that is linked to the mold base.

8. An apparatus for slidably linking a slide member to a mold base in an injection mold, the mold base having a confronting surface, the slide member having a complementary confronting surface, the apparatus comprising:
   a connecting structure configured to maintain a gap between the confronting surface and the complementary confronting surface during at least a portion of a movement of the slide member between an out-mold position and an in-mold position so that wearing of the confronting surface and the complementary confronting surface is reduced;
   the connecting structure is further configured to enable a positive contact between the confronting surface and the complementary confronting surface in response to an applied clamping force between the slide member and the mold base
   wherein the connecting structure includes:
      a connecting member connected to the slide member;
      a gib having a block through which a tubular bushing is slidably arranged;
      the tubular bushing having a flange that provides an upper stop to limit a travel of the block;
      a portion of the tubular bushing receivable within a complementary bore defined through a top portion of a plate, of the mold base, to a depth that permits the block a limited degree of freedom to slide on the tubular bushing between the upper stop and a lower stop provided by a top surface of the plate;
      a guide arranged in the block, the guide configured to cooperate with the connecting member to accommodate a sliding of the connecting member;
      a compressible member 696 arranged between the mold base and the block to urge the block against the upper stop and in this way urge the slide member upwardly to form the gap.

9. The apparatus of claim 8, wherein the connecting structure is configured to maintain at least a portion of the gap when the slide member is arranged in the in-mold position.

10. The apparatus of claim 8, wherein the slide member is configured for receiving a molding insert for defining a molding cavity in the injection mold.

11. The apparatus of claim 8, wherein the slide member is configured for performing a further operation, wherein the further operation includes at least one of:
   removing a molded article from a molding cavity of the injection mold;
   placing an insert in the molding cavity;
   exercising a portion of the molded article.

12. The apparatus of claim 8, wherein the gap between the confronting surface and the complementary confronting surface is between 0.1 mm and 2.0 mm.

13. The apparatus of claim 8, wherein the connecting structure includes:
   a guide linked to said mold base configured for slidably receiving the connecting member.

14. The apparatus of claim 13, wherein the guide is defined between a surface of a groove formed in the mold base and a surface of the gib that is linked to the mold base.

* * * * *